US011002139B2

(12) United States Patent
Pearson

(10) Patent No.: US 11,002,139 B2
(45) Date of Patent: May 11, 2021

(54) COOLED POLYMER COMPONENT

(71) Applicant: Hamilton Sundstrand Corporation, Charlotte, NC (US)

(72) Inventor: Matthew Robert Pearson, Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 326 days.

(21) Appl. No.: 15/838,668

(22) Filed: Dec. 12, 2017

(65) Prior Publication Data
US 2019/0178092 A1 Jun. 13, 2019

(51) Int. Cl.
*F01D 5/08* (2006.01)
*F01D 5/18* (2006.01)
*F01D 5/28* (2006.01)
*B29D 99/00* (2010.01)
*F01D 25/00* (2006.01)

(52) U.S. Cl.
CPC ......... *F01D 5/189* (2013.01); *B29D 99/0025* (2013.01); *F01D 5/186* (2013.01); *F01D 5/187* (2013.01); *F01D 5/28* (2013.01); *F01D 25/005* (2013.01); *F05D 2220/32* (2013.01); *F05D 2230/21* (2013.01); *F05D 2230/22* (2013.01); *F05D 2240/12* (2013.01); *F05D 2240/30* (2013.01); *F05D 2260/202* (2013.01); *F05D 2300/43* (2013.01); *F05D 2300/437* (2013.01); *F05D 2300/44* (2013.01)

(58) Field of Classification Search
CPC .......... F01D 5/189; F01D 5/28; F04D 29/388; F05D 2250/61; F05D 2260/202; F05D 2230/30
See application file for complete search history.

(56) References Cited

U.S. PATENT DOCUMENTS

| | | | | |
|---|---|---|---|---|
| 2,868,439 | A * | 1/1959 | Hampshire | F01D 5/282 415/141 |
| 2,994,124 | A | 8/1961 | Denny et al. | |
| 3,219,123 | A * | 11/1965 | Horst | B29D 24/001 416/230 |
| 3,444,925 | A | 5/1969 | Johnson | |
| 3,501,090 | A * | 3/1970 | Soffer | F01D 5/282 416/189 |
| 3,532,438 | A * | 10/1970 | Palfreyman | F01D 5/021 416/213 R |
| 3,532,439 | A | 10/1970 | Palfreyman et al. | |
| 3,758,232 | A * | 9/1973 | Wallett | F01D 5/282 416/213 R |

(Continued)

FOREIGN PATENT DOCUMENTS

WO    2015006438 A1    1/2015

OTHER PUBLICATIONS

The Extended European Search Report for EP Application No. 18212099.8, dated Apr. 15, 2019.

(Continued)

*Primary Examiner* — Ninh H. Nguyen
(74) *Attorney, Agent, or Firm* — Carlson, Gaskey & Olds, P.C.

(57) ABSTRACT

A polymer airfoil assembly is disclosed and includes at least one cooling passage for circulating coolant to remove heat from the polymer airfoil portion.

8 Claims, 3 Drawing Sheets

(56) References Cited

U.S. PATENT DOCUMENTS

| | | | | |
|---|---|---|---|---|
| 4,037,990 | A * | 7/1977 | Harris | F01D 5/3053 |
| | | | | 416/220 R |
| 4,359,310 | A * | 11/1982 | Endres | F01D 5/187 |
| | | | | 415/115 |
| 5,516,260 | A * | 5/1996 | Damlis | F01D 5/189 |
| | | | | 415/115 |
| 8,573,948 | B2 * | 11/2013 | Jevons | F01D 9/041 |
| | | | | 416/233 |
| 9,932,835 | B2 * | 4/2018 | Slavens | F01D 5/18 |
| 2016/0160863 | A1 | 6/2016 | Roach et al. | |
| 2016/0273372 | A1 | 9/2016 | Podgorski et al. | |
| 2018/0016917 | A1 * | 1/2018 | Tallman | F02C 7/12 |
| 2018/0057170 | A1 * | 3/2018 | Sautron | F02C 6/08 |

OTHER PUBLICATIONS

European Search Report for European Application No. 20185083.1 dated Oct. 9, 2020.

* cited by examiner

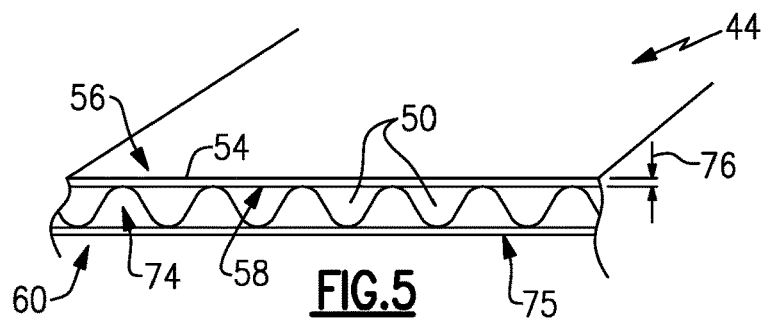
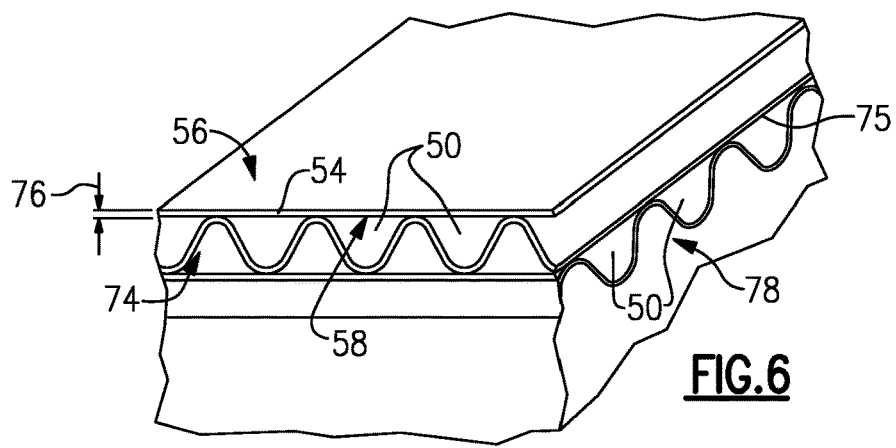
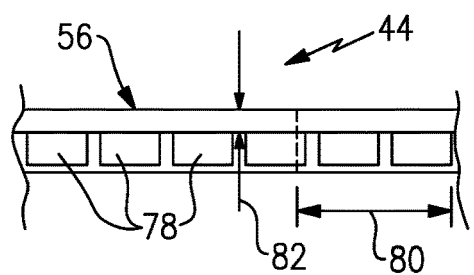
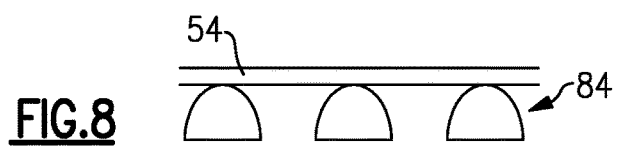
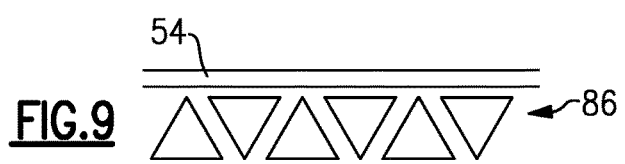

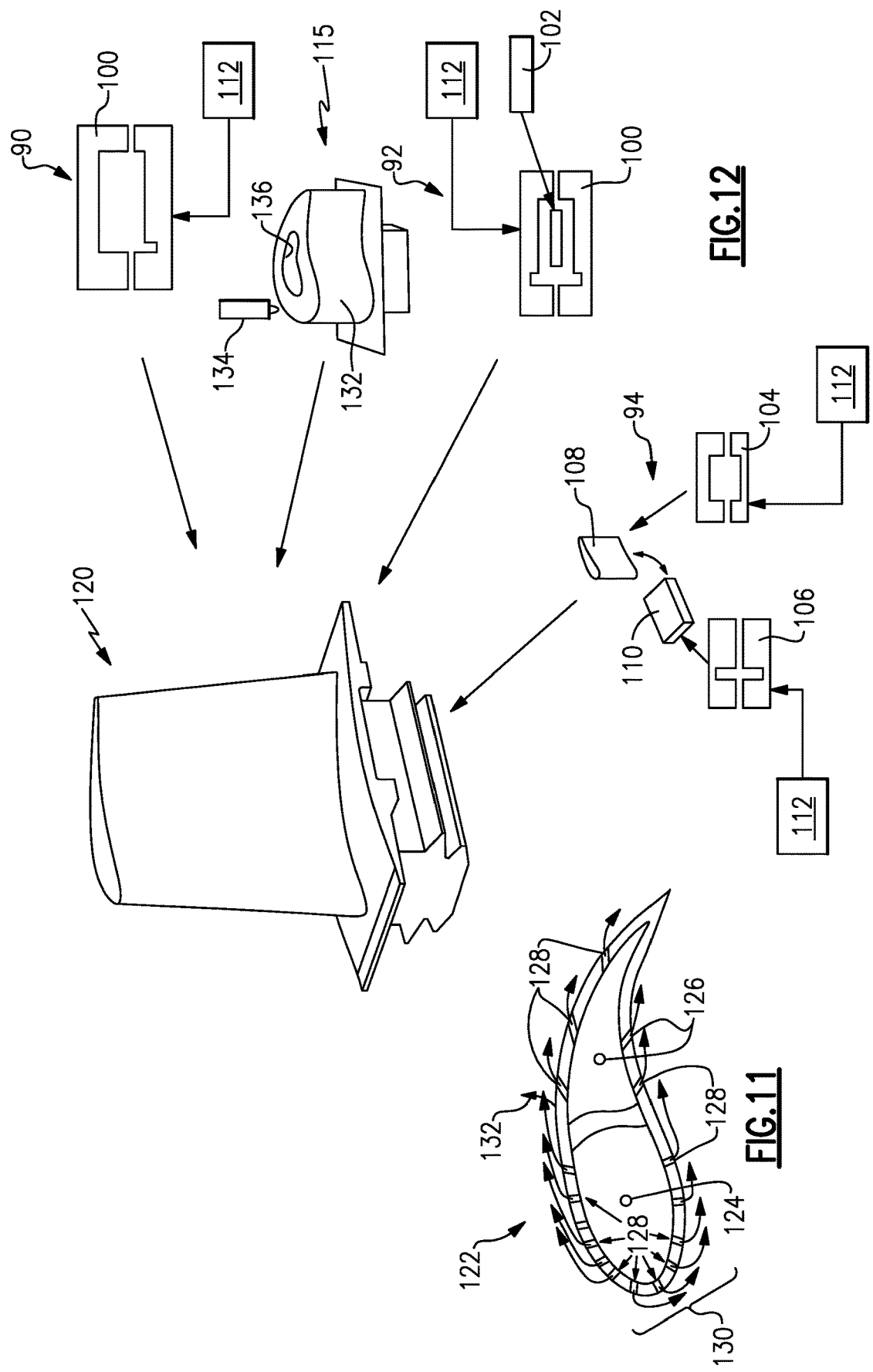

US 11,002,139 B2

COOLED POLYMER COMPONENT

BACKGROUND

Most components in a gas turbine engine are exposed to extreme temperatures and pressures that dictate the use of high temperature compatible materials such as metals and ceramics. Moreover, even with the use of high temperature compatible materials, additional cooling features are needed to provide desired performance and durability. Some systems are exposed to lower temperatures and still use metals that are well within acceptable working temperatures. Polymer materials do not have high working temperatures as compared to metals and ceramics. However, polymer materials are easily formed and less costly in comparison to metals and ceramic materials.

SUMMARY

A polymer airfoil assembly according to an exemplary embodiment of this disclosure, includes among other possible things a polymer airfoil portion and at least one cooling passage within the polymer airfoil portion for circulating a coolant to remove heat from the polymer airfoil portion.

A component for a system of a gas turbine engine according to another exemplary embodiment of this disclosure, includes among other possible things a body portion formed from a polymer material and at least one cooling passage configured to allow coolant to pass therethrough to enable the component to operate while exposed to temperatures in excess of a predefined temperature range of the polymer material.

A method of forming a body portion of a component for a gas turbine engine according to another exemplary embodiment of this disclosure, includes among other possible things forming the body portion from a polymer material and forming at least one cooling passage within the body portion configured to allow coolant to flow therethrough.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 5 is a cross-sectional view of a portion of an example polymer airfoil embodiment.

FIG. 6 is another cross-sectional view of another example polymer airfoil embodiment.

FIG. 7 is a cross-sectional view of a portion of another polymer airfoil embodiment.

FIG. 8 is a schematic view of a cross-section of example group of coolant passages.

FIG. 9 is a cross-section of another group of example coolant passages.

FIG. 10 is a schematic view of yet another group of example coolant passages.

FIG. 11 is a cross-sectional view of another example polymer airfoil embodiment.

FIG. 12 is a schematic view of an example method of fabricating a polymer airfoil.

DETAILED DESCRIPTION

Figure 1:
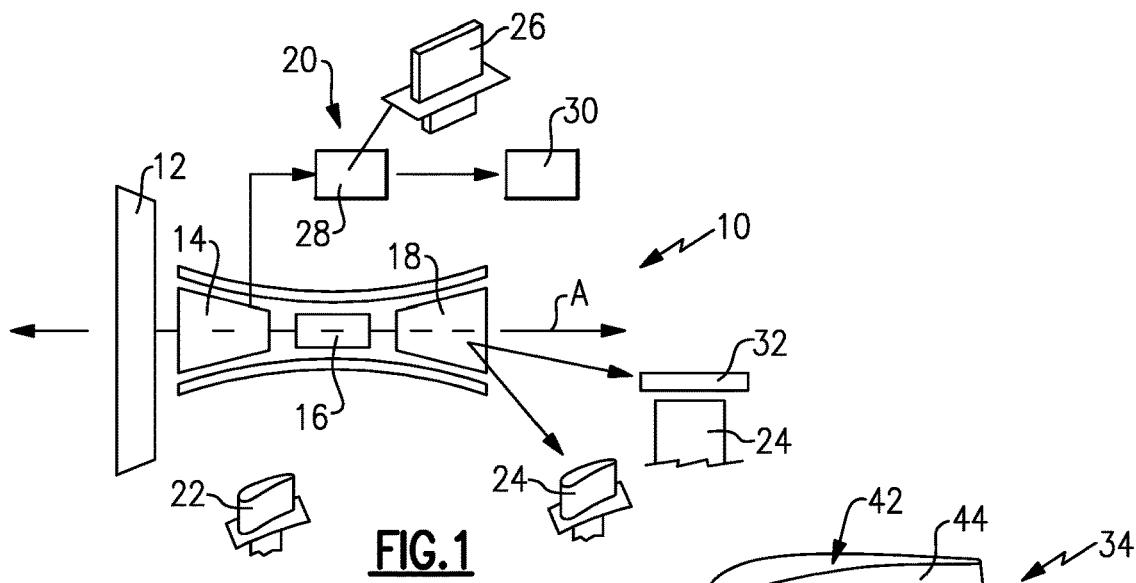
FIG. 1 is a schematic view of an example gas turbine engine.

Referring to FIG. 1, an example gas turbine engine 10 is schematically shown and includes a fan 12, a compressor 14, a combustor 16 and a turbine 18 all disposed along a common longitudinal engine axis A. Air is compressed in the compressor 14, communicated to the combustor 16, mixed with fuel and ignited to generate a high energy exhaust flow that is expanded through the turbine 18. The turbine 18 converts the high energy exhaust flow to mechanical energy to drive the fan 12 and compressor 14. Each of the compressor 14 and turbine 18 include airfoils 22, 24, respectively. The airfoils 22, 24 are either part of a rotating blade or a fixed vane and both are within the contemplation of this disclosure. The turbine 18 may also include blade outer air seals 32 that are disposed proximate to tips of the airfoils 24 to maintain a desired clearance. The aforementioned and other components within the gas stream are exposed to high working temperatures.

The example gas turbine engine 10 also includes an environmental control system 20 that draws air from a portion of the compressor 14 and utilizes that air for use in other system schematically shown at 30 for cooling airflow or for cooling of an aircraft cabin. Some environmental control systems 20 include a turbo compressor 28 that also may include airfoils 26 within compressor and turbine sections. Moreover, although the disclosed example illustrates air drawn from the engine, air for the cabin may draw air from the atmosphere, an engine bypass flow path or other sources.

Polymer materials have a very low working temperature capability as compared to the materials currently utilized in sections exposed to high temperatures. However, some sections of the engine or system may operate within a temperature range just outside working ranges of known polymer materials.

Figure 2:
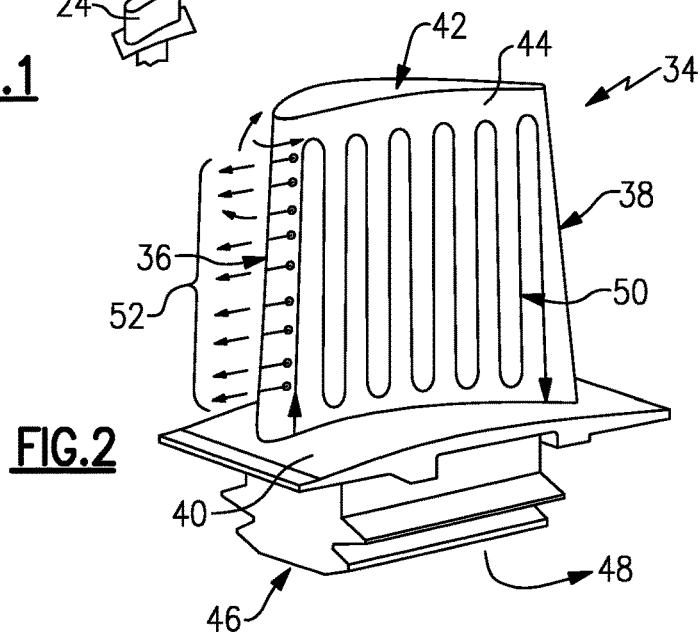
FIG. 2 is a schematic view of an example polymer airfoil embodiment.

Referring to FIG. 2 with continued reference to FIG. 1, an example airfoil 34 is illustrated and is formed from a polymer material. Polymer materials provide easier manufacturability as they may be formed utilizing common insert molding or other molding processes. The example polymer airfoil 34 includes a leading edge 36, a trailing edge 38 and an airfoil portion 44 that extends from a platform 40 to a tip 42. It should be understood that although the example airfoil 34 is shown as a blade, the contents of this disclosure are applicable to vanes, blades as well as other components exposed to temperatures just above a working temperature range of known polymer materials.

The example polymer airfoil 34 includes cooling air passages 50 that receive cooling air from an inlet 46 and exhaust that cooling air out an outlet 48. The use of cooling passages within the polymer airfoil 34 maintains a temperature of the airfoil 34 within acceptable ranges of the airfoil 34 making it applicable for use in various systems and locations within a gas turbine engine that would not otherwise be suitable for polymer materials.

Polymer materials have a lower thermal conductivity and therefore coolant fed through cooling passages 50 absorbs less heat as compared to metal or ceramic materials. The reduced thermal conductivity of the polymer materials enables the cooling passages to be longer as coolant within the cooling passages does not heat up as quickly compared to coolant within a part made from a more thermally conductive material. Moreover, the example cooling passages 50 are much closer to an outer surface of the airfoil 34 to accommodate the lower thermal conductivity. The cooling passages 50 may communicate airflow to cooling holes 52 to generate external film cooling along surfaces of the airfoil 34.

Figure 3:
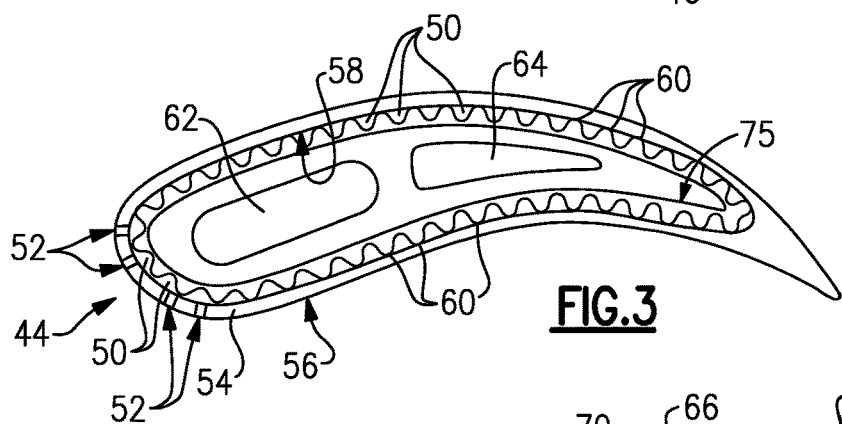
FIG. 3 is a cross-sectional through an example polymer airfoil embodiment.

Referring to FIG. 3 with continued reference to FIG. 2, the example polymer airfoil 34 is shown in cross-section and includes a wall 54 including an external surface 56 and an internal surface 58. The plurality of passages 50 for coolant are schematically shown as formed by corrugations 60 along the inner surface 58 of the airfoil wall 54. The corrugations 60 are provided between an inner wall 75 and the inner surface 58 to provide the passages 50 for cooling airflow proximate to the inner surface 58 to cool the airfoil surface 56 and improve the working temperature capability of the polymer material utilized to form the airfoil 34. The working temperature capability of polymer material as utilized in this disclosure is that temperature range or upper limit where the material properties of the polymer material maintain predefined structural characteristics for a predefined period. The airfoil 34 may include internal cavities 62, 64 that feed and collect cooling airflow not exhausted through cooling holes 52.

Figure 4:
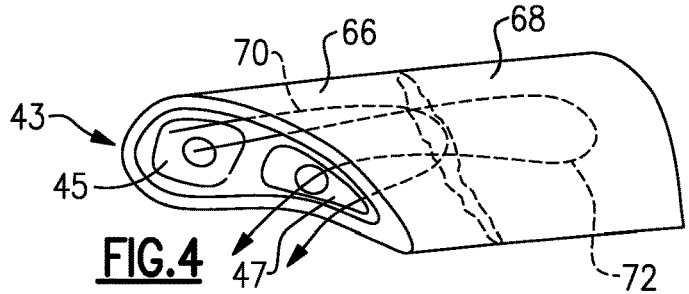
FIG. 4 is a schematic view of a portion of an example polymer airfoil embodiment.

Referring to FIG. 4 with continued reference to FIG. 3, because the polymer material has a lower thermal conductivity, the passages 50 may be of increased length. In this example, it is schematically shown that a first passage 72 is provided that communicates cooling air to a first portion 68. A second passage 70 is provided that provides cooling airflow to a second portion 66. Because coolant within the coolant passages 70, 72 does not absorb heat as quickly, longer passages can be utilized to communicate airflow to specific locations within the airfoil 34.

In this disclosed example, cooling air is communicated into an airfoil 43 through an inlet 45 and exhausted through an outlet 47 that is separated from the flow over the airfoils surfaces. The example airfoil 43 differs from the previous example airfoil 44 by not including film cooling openings that are in communication with the airflow. In some instances, the airfoil 43 may be in environment where cooling air within the airfoil 43 is a lower pressure than flow on the outside of the airfoil 43. In such an instance, higher pressure external airflows would flow into the airfoil 43. Therefore in the disclosed airfoil 43, cooling air inlet and exhausted from the cooling passages 72 and 70 through a surface not in communication with external airflows. The separation enables lower pressures of cooling air to be used within the airfoil 43.

Referring to FIG. 5 with continued reference to FIGS. 2 and 3, the example airfoil 44 is shown in cross-section with a portion of the wall 54. The corrugations 60 are provided between the inner wall 75 and abutted against the inner surface 58 at a thickness 76 from the outer surface 56 of the wall 54. In one example, the thickness 76 is approximately 1 mm (0.039 inch). In another example, the thickness 76 is between 0.5 mm (0.012 inch) and 2 mm (0.079 inch). Moreover, the disclosed ranges of thicknesses could be modified and therefore other thickness ranges are within the contemplation of this disclosure. The reduced thickness 76 of the wall 54 in the portions where the corrugations 60 enable the coolant to be closer to the surface 56 to improve conduction of heat into coolant.

Referring to FIG. 6, in another example cooling passage configuration, a first set of corrugations 74 is shown extending in a first direction and a second set of corrugations 78 is shown in a direction transverse to the first direction of the first set of corrugations 74. The corrugations 74, 78 maybe orientated such that passages are 90 degrees from each other of at an acute angle no less than about 25 degrees. The corrugations 74, 78 provide strength to enable the internal channels to be extremely close to the external surface 56 to improve thermal transfer and cooling.

Referring to FIG. 7, in another disclosed example a width 80 along with the thickness 82 is utilized to provide a dense array of near surface passages 78 to aid in heat transfer through the thin layer of polymer material. The dense array is provided by having multiple passages within the width 80, along with the thickness 82 to accommodate the low thermal conductivity of the materials utilized to form the example airfoils.

In one disclosed example embodiment the density of the cooling passages 78 as a ratio passage open area for a given length is between about 0.5 and 0.8. As an example the cooling passages 78 may include an open area of 0.8 inches for each 1.0 inch of width 80 to provide a ratio of 0.8. An open area provided by the cooling passage may be 0.5 inches for each 1.0 inch of width providing a ratio of 0.5. As appreciated, other open area ratios may be utilized and are within the contemplation of this disclosure.

The disclosed example airfoil is formed from a polymer material. It should be understood that the disclosed and described polymer material could comprise any polymer material as is recognized in the art including, for example, polyvinyl chloride (PVC), polystyrene, polyethylene, polypropylene, polyacrylonitrile, PVB, silicone, polyurethane cyanate ester and epoxy along with other know polymer blends. Moreover, other polymer materials as are known in the art that would be suitable for formation of an airfoil to provide the desired structural rigidity, manufacturability and working temperature conditions could be utilized and are within contemplation and scope of this disclosure.

Referring to FIG. 8, the example corrugations may include a D-shaped cross-section as is illustrated and schematically shown at 84.

Referring to FIG. 9, another cross-sectional shape of the example passages is indicated at 86 includes triangle shaped passages that are inverted in alternating pattern. The alternating pattern of triangles provide for an increased density of cooling passages near the wall 54 of the airfoil.

Referring to FIG. 10, another cross-sectional shape of the cooling passages shown at 88 includes triangles arranged in a non-inverted manner.

Referring to FIG. 11, another airfoil embodiment is disclosed and schematically indicated at 122. The airfoil 122 includes internal chambers 124 and 126 that communicate cooling airflow to film cooling openings 128 distributed throughout the airfoil 122. The low heat transfer properties of the polymer materials are such that internal cooling features may be of only limited cooling efficiency. Accordingly, the cooling method for the example airfoil 122 is provided by film air cooling generated by airflow through the multiple film cooling openings 128.

Referring to FIG. 12, an example method of forming the polymer airfoil 120 is schematically shown and includes a first process 90 of molding an airfoil 120 as a complete homogenous shape by a single mold 100. In this example, a polymer material 112 is injected into the mold 100 that is configured to define the shape of the example airfoil 120. It should be understood that the mold 100 could be of any configuration understood to be utilized to performing plastic parts including slides, inserts and other known molding features utilized to form features of the example polymer airfoil 120.

Schematically shown at 92 is another process of forming the polymer airfoil 120 and includes the use of an insert 102 of a material not the same as the polymer material utilized to form the airfoil 120. The insert 102 is placed into the mold 100 and over molded with polymer material to provide internal features of the completed polymer airfoil 120 including a cooling air passage and/or chambers within the airfoil 120. In one disclosed example, the insert 102 is of a different polymer material than the polymer material utilized to form the outer surfaces of the airfoil. Moreover, the insert 102 may also be of a metal material or any other materials different from the polymer material utilized performing the outer features of the polymer airfoil 120. The insert 102 may remain as part of the completed airfoil 120, or be removed to define internal features.

Another example process schematically indicated at 94 includes the creation of the completed polymer airfoil 120 as different separately molded components. In the previously disclosed methods of forming the polymer airfoil the airfoil was formed as a single homogenous part in a completed shape. In the example process illustrated at 94, several molds 104, 106 are utilized to form various pieces 108, 110 that are later joined to form a completed polymer airfoil schematically shown at 120.

Another example process schematically indicated at 115 includes additive manufacturing methods where an airfoil or other component 132 is built layer by layer by depositing and melting material from an applicator 134. The use of additive manufacturing methods to build a component 132 enables formation of intricate internal features schematically shown at 136 that may not be feasible or practical utilizing known molding techniques.

The disclosed example polymer airfoil includes cooling passages that enable and accommodate the low thermal conductivity that is a characteristic of polymer materials. By providing cooling passages specifically configured to accommodate the low thermal capacity of the polymer material, the use of polymer material for applications and environments that exceed normal working temperatures become feasible and enable incorporation of polymer materials into various gas turbine engine systems, components and sections.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A polymer airfoil arrangement comprising:
   a polymer airfoil portion, the polymer airfoil portion includes an outer wall having an external surface and an internal surface; and
   at least one cooling passage within the polymer airfoil portion for circulating a coolant to remove heat from the polymer airfoil portion, wherein the polymer airfoil portion is a homogenous polymer material and at least a portion of the at least one cooling passage is formed from an insert having a different material property than the polymer airfoil portion, wherein the at least one cooling passage comprises a first corrugation orientated in a first direction within the polymer airfoil portion along the internal surface and at least one cooling hole is disposed through the outer wall for supplying a flow of cooling air along the external surface of the polymer airfoil portion, wherein the at least one cooling passage comprises a second corrugation orientated transverse to the first corrugation along the internal surface.

2. The polymer airfoil as recited in claim 1, wherein the at least one cooling passage comprises a plurality of channels having one of a D-shaped cross-section and triangular-shaped cross-section.

3. The polymer airfoil portion as recited in claim 1, wherein the polymer airfoil portion is formed of a polymer comprising one of a polyvinyl chloride, polystyrene, polyethylene, polypropylene, polyacrylonitrile, silicone, polyeurethane cyanate ester and epoxy.

4. The polymer airfoil as recited in claim 1, wherein the polymer airfoil portion comprises different assembled polymer components.

5. A polymer airfoil arrangement comprising:
   a polymer airfoil portion, the polymer airfoil portion includes an outer wall having an external surface and an internal surface; and
   at least one cooling passage within the polymer airfoil portion for circulating a coolant to remove heat from the polymer airfoil portion, wherein the polymer airfoil portion is a homogenous polymer material and at least a portion of the at least one cooling passage is formed from an insert having a different material property than the polymer airfoil portion, wherein the at least one cooling passage comprises a first corrugation orientated in a first direction within the polymer airfoil portion along the internal surface and at least one cooling hole is disposed through the outer wall for supplying a flow of cooling air along the external surface of the polymer airfoil portion, wherein that at least one cooling passage comprises a plurality of channels having a triangular-shaped cross-section with alternating rows including an inverted triangular-shaped cross-section.

6. A polymer airfoil arrangement comprising:
   a polymer airfoil portion, the polymer airfoil portion includes an outer wall having an external surface and an internal surface;
   at least one cooling passage within the polymer airfoil portion for circulating a coolant to remove heat from the polymer airfoil portion, wherein the polymer airfoil portion is a homogenous polymer material and at least a portion of the at least one cooling passage is formed from an insert having a different material property than the polymer airfoil portion, wherein the at least one cooling passage comprises a first corrugation orientated in a first direction within the polymer airfoil portion along the internal surface and at least one cooling hole is disposed through the outer wall for supplying a flow of cooling air along the external surface of the polymer airfoil portion; and
   a first cavity within the polymer airfoil portion in fluidic communication with the at least one cooling passage.

7. The polymer airfoil as recited in claim 6, further comprising second cavity within the polymer airfoil portion and spaced apart from the first cavity, the at least one cooling passage being in fluidic communication with both the first cavity and the second cavity.

8. The polymer airfoil as recited in claim 7, wherein the first cavity supplies cooling airflow to a cooling passage in a first part of the polymer airfoil portion and second cavity supplies cooling airflow to passages in a second part of the polymer airfoil portion.

\* \* \* \* \*